United States Patent Office 3,446,781
Patented May 27, 1969

3,446,781
SOLUBLE CURED POLYESTER POLYURETHANES
John E. Brownsword, Cuyahoga Falls, Ohio, assignor to The Goodyear Tire & Rubber Company, Akron, Ohio, a corporation of Ohio
No Drawing. Filed Apr. 4, 1966, Ser. No. 539,664
Int. Cl. C08g 28/06
U.S. Cl. 260—75          10 Claims

ABSTRACT OF THE DISCLOSURE

A cured polymeric polyurethane having superior physical properties, substantially soluble in methyl ethyl ketone and the method for its preparation which consists essentially of reacting an organic diisocyanate with the mixture which comprises a hydrocarbon diol, a diamino diphenyl sulfone and a polymeric polyester of 1,4-butane diol and adipic acid, and curing the reaction mixture.

---

This invention relates to cured polymeric materials prepared from isocyanate-modified polyesters, to methods of preparing them, and to products prepared therefrom.

It is generally known that polymeric polyurethanes can be prepared by the reaction of polyisocyanates with polymeric polyesters. According to the prior art various diamines have been added to the products of such reactions to act as curatives which chain-extend and cross-link the polymeric polyurethanes and form cured polyurethanes having superior physical characteristics, particularly high tensile strengths and elongations. A diamine curative such as a sulfone diamine can be used for this purpose. The sulfone diamine crosslinked polymeric polyester-polyurethanes of the prior art which have commercially useful superior physical properties, are not substantially soluble in solvents which are non-toxic and low in cost such as the lower ketones.

Now it has been found unexpectedly that a cured polymeric polyurethane having superior physical characteristics and substantially soluble in solvents such as the lower ketones can be prepared wherein an organic diisocyanate is reacted with a mixture of a particular type of polyester, a hydrocarbon diol, and a sulfone diamine in certain critical ratios. Thus, according to the invention, a cured polymeric polyurethane having superior physical properties and substantially soluble in methyl ethyl ketone is prepared by reacting from about 1.5 to about 1.7 mols of a diisocyanate with a mixture which comprises from about 0.4 to about 0.6 mol of a hydrocarbon diol having from 2 to about 10 carbon atoms and having terminal hydroxyl groups, from about 0.03 to about 0.05 mol of a diamino diphenyl sulfone, and 1.0 mol of a polymeric polyester which is the condensation reaction product of 1,4-butane diol and adipic acid and having a molecular weight of from about 700 to about 1500 and an acid number of less than about 10, wherein the isocyanate groups of the diisocyanate are equal to from about 92 to about 97 percent of the total reactive hydrogens supplied by the polymeric polyester, the hydrocarbon diol, and the diamino diphenyl sulfone, and curing the reaction mixture.

In preparing the polyurethanes of this invention it is usually more preferable to adjust the ratio of the reactants so that the isocyanate groups of the diisocyanate are equal to from about 94 to about 97 percent of the total reactive hydrogens supplied by the polymeric polyester, the hydrocarbon diol, and the diamino diphenyl sulfone. The reactive hydrogens are supplied by hydroxyl groups and amino groups.

Thus, it is an important feature of this invention that in addition to reacting certain amounts of certain materials, a particular order of addition is important in that it is preferred that first a mixture is prepared of the polyester, hydrocarbon diol, and the sulfone diamine and then the organic diisocyanate is added to the mixture.

Various hydrocarbon diols and mixtures of diols can be used to prepare the polyurethanes of this invention. Representative of such diols are ethylene glycol, 1,4 butane diol, 1,5 pentane diol, and 1,6 hexane diol.

It is generally preferred that the diamine curatives of this invention be diamino diphenyl sulfones. Representative of such sulfones are 4,4' diamino diphenyl sulfone and 3,3' diamino diphenyl sulfone.

Various diisocyanates can be used in preparing the polyurethanes. Representative of such diisocyanates are 4,4' diphenyl methane diisocyanate and 4,4' dicyclo hexyl methane diisocyanate.

In the practice of this invention, if desired, the mixture of the polyester, hydrocarbon diol, and sulfone diamine may be heated to reduce its viscosity before adding the diisocyanate. After the addition of the diisocyanate, the polymerization reaction is generally carried out over a period of from about a minute up to an hour or more. Generally a reaction time of from about 1 to about 10 minutes is sufficient to prepare the polymeric polyurethanes of this invention. The temperature of the polymerization reaction is not critical and can be varied over a wide range. Suitable reaction temperatures are from about 60° C. to about 100° C., although higher or lower temperatures can be used. Also, the reaction pressure is not critical and may be atmospheric or above or below atmospheric pressure.

The resulting polyurethane is then heated to effect the cure. It is generally preferred that the polyurethane is cured in an inert and dry atmosphere. A temperature of from about 100° C. to about 200° C. for about 10 minutes to about 6 hours at about atmospheric pressure is generally sufficient to effect the cure although higher or lower pressures can be used.

The cured polymeric polyurethanes of this invention have superior physical properties and can be dissolved in a suitable solvent, if desired, to form solutions which can be utilized for castings, coatings, cements, and the like. Such cured polymeric polyurethanes can have ultimate tensile strengths of from about 3000 to about 7500 pounds per square inch with elongations of from about 600 to about 800 percent.

While various solvents can be used to dissolve the cured polyurethanes of this invention, it has surprisingly been found that these cured polyurethanes are substantially soluble in methyl ethyl ketone. It is a particular advantage to dissolve cured polymeric polyurethanes having superior physical properties in such a solvent because of the relatively low cost of the solvent, its low toxicity and its relatively high volatility. Solvents and mixtures of solvents which are generally used for forming solutions of other polyurethanes having superior physical properties can also be used although they are more toxic and more costly than methyl ethyl ketone. Representative examples of such other solvents include dimethyl formamide, dimethyl acetamide, dimethyl propionamide, dimethyl sulfoxide, and tetrahydrofuran.

The solutions of this invention may be formed by methods of preparing solutions of elastomers known to those skilled in the art. The cured polyurethane solvent mixture may be heated to decrease the time required to prepare these solutions. Generally, solutions of up to about 50 percent by weight solids content of the cured polyurethane can be prepared at about 20° C., with the solutions becoming more viscous as the solids content is increased. Thus, the solids content of the solution can be varied depending upon the intended application or use.

It is a further advantage of this invention that the cured polyurethane having superior physical properties can now be prepared and stored in a low-cost and relatively non-toxic solvent for long periods of time and the solution used to coat various structural surfaces or fabrics and for forming various structures. Heretofore, polymeric materials having superior physical properties were prepared from diamine modified polyester-polyurethanes reaction mixtures by applying them immediately after mixing. Such materials were prepared by immediately coating materials or immediately filling molds with the liquid polyester-polyurethane reaction mixture after the curvative diamine was added and then curing the reaction mixture to form a coated or structural product. Although products could be prepared from such polyurethanes by dissolving the cured polyurethane in a solvent, applying a coating of the solution, and evaporating the solvent from the solution, useable solvents are both costly and toxic.

The following example further illustrates this invention. The parts and percentages are by weight unless otherwise indicated.

Example 1

In a suitable reactor was placed 100 parts of a polyester prepared by the condensation of 1,4 butane diol with adipic acid. This polyester had a hydroxyl number of approximately 100, an acid number of approximately 0.5, and a molecular weight of approximately 1000. The polyester was heated to 90° C. to liquefy the polyester. The liquified polyester was stirred for one hour at 90° C. at a reduced pressure of about 5 to 10 millimeters of mercury absolute. The pressure was then adjusted to atmospheric pressure. To 5.43 parts of 1,4 butane diol, from which water had been removed by distilling 10% by weight of the diol, was added 0.95 part of 4,4' diamino diphenyl sulfone. The 4,4' diamino diphenyl sulfone was dissolved in the 1,4 butane diol at about 50° C. and the resulting solution added to the liquified polyester. The mixture was stirred for 5 minutes until the temperature of the mixture was allowed to reach 80° C. At this time, 39.7 parts of 4,4' diphenyl methane dissocyanate was added to the stirred mixture. The mixture was stirred for an additional 2 minutes and quickly poured into a pint can, and the pint can covered to maintain an inert atmosphere. The pint can had previously been pre-dried by heating to 110° C. The mixture in the pint can was cured by placing it in a hot air oven at 140° C. for 3½ hours.

The cured material was broken into small particles and added to 600 parts of methyl ethyl ketone at about 70° C. After all of the particles had dissolved in the methyl ethyl ketone, the resultant viscous solution was coated onto a glass plate and allowed to dry. The resulting coating was of about 5 mils thickness and had an ultimate tensile strength of about 6000 pounds per square inch, an ultimate elongation of about 650 percent, and a Shore A hardness of about 75.

While various representative embodiments and details have been shown for the purpose of illustrating this invention, it will be apparent to those skilled in the art that various changes and modifications may be made without departing from the spirit or scope of this invention.

What is claimed is:

1. A method of preparing a cured polymeric polyurethane that is substantially soluble in methyl ethyl ketone consisting essentially of reacting from about 1.5 to about 1.7 mols of an organic diisocyanate with a mixture which comprises from about 0.4 to about 0.6 mol of a hydrocarbon diol having from 2 to about 10 carbon atoms and having terminal hydroxyl groups, from about 0.03 to about 0.05 mol of a diamine diphenyl sulfone, and 1.0 mol of a polymeric polyester condensation reaction product of 1,4-butane diol and adipic acid having a molecular weight of from about 700 to about 1500 and an acid number of less than about 10, wherein the isocyanate groups of the diisocyanate are equal to from about 92 to about 97 percent of the total reactive hydrogens supplied by the polymeric polyester, the hydrocarbon diol, and the diamino diphenyl sulfone, and curing the reaction mixture.

2. A method according to claim 1 of preparing a cured polyurethane that is substantially soluble in methyl ethyl ketone consisting essentially of reacting at a temperature of from about 60° C. to about 100° C. for about 1 to about 10 minutes from about 1.5 to about 1.7 mols of an organic diisocyanates selected from 4,4'-diphenyl methane diisocyanate and 4,4'-dicyclo hexyl methane diisocyanate with a mixture which comprises from about 0.4 to about 0.6 mol of a hydrocarbon diol selected from ethylene glycol, 1,4-butane diol, 1,5-pentane diol, and 1,6-hexane diol, from about 0.03 to about 0.05 mol of a diamino diphenyl sulfone, and 1.0 mol of a polymeric polyester condensation reaction production of 1,4-butane diol and adipic acid having a molecular weight of from about 700 to about 1500 and an acid number of less than about 10, wherein the isocyanate groups of the diisocyanate are equal to from about 94 to about 97 percent of the total reactive hydrogens supplied by the polymeric polyester, the hydrocarbon diol, and the diamino diphenyl sulfone, and curing at a temperature of from about 100° C. to about 200° C.

3. A cured polymeric polyurethane having superior physical properties and substantially soluble in methyl ethyl ketone prepared by the method of claim 1 consisting essentially of reacting from about 1.5 to about 1.7 mols of an organic diisocyanate with a mixture which comprises from about 0.4 to about 0.6 mol of a hydrocarbon diol having from 2 to about 10 carbon atoms and having terminal hydroxyl groups, from about 0.03 to about 0.05 mol of a diamino diphenyl sulfone, and 1.0 mol of a polymeric polyester condensation reaction product of 1,4-butane diol and adipic acid having a molecular weight of from about 700 to about 1500 and an acid number of less than about 10, wherein the isocyanate groups of the diisocyanate are equal to from about 92 to about 97 percent of the total reactive hydrogens supplied by the polymeric polyester, the hydrocarbon diol, and the diamine diphenyl sulfone, and curing the reaction mixture.

4. A method according to claim 1 wherein the diisocyanate is 4,4' - diphenyl - methane - diisocyanate, and the diamino-diphenyl sulfone is 4,4'-diamino-diphenyl sulfone.

5. A method according to claim 4 wherein the hydrocarbon diol is 1,4 butane diol.

6. A method according to claim 3 wherein the isocyanate groups of the diisocyanate are equal to from about 94 to about 97 percent of the said total reactive hydrogens.

7. A cured polymeric polyurethane according to claim 3 wherein the diisocyanate is 4,4' diphenyl methane diisocyanate and the sulfone is 4,4' diamino diphenyl sulfone.

8. A cured polymeric polyurethane according to claim 7 wherein the hydrocarbon diol is 1,4 butane diol.

9. A cured polymeric polyurethane according to claim 8 wherein the said cured polyurethane has an ultimate tensile strength of from about 3000 to about 7500 pounds per square inch with an elongation of from about 600 to about 800 percent.

10. A cured polymeric polyurethane having superior physical properties and substantially soluble in methyl ethyl ketone prepared by the method of claim 9, consisting essentially of reacting at a temperature of from about 60° C. to about 100° C. for about 1 to about 10 minutes from about 1.5 to about 1.7 mols of an organic diisocyanate selected from 4,4'-diphenyl methane diisocyanate and 4,4'-dicyclo hexyl methane diisocyanate with a mixture which comprises from about 0.4 to about 0.6 mol of a hydrocarbon diol selected from ethylene glycol, 1,4-butane diol, 1,5-pentane diol, and 1,6-hexane diol, from about 0.03 to about 0.05 mol of a diamino diphenyl sulfone, and 1.0 mol of a polymeric polyester condensation reaction product of 1,4-butane diol and adipic acid having a molecular weight of from about 700 to about 1500 and an acid number of less than about 10, wherein the isocyanate groups of the diisocyanate are equal to from about 94 to about 97 percent of the total reactive hydrogens supplied by the polymeric polyester, the hydrocarbon diol, and the diamino diphenyl sulfone, and curing at a temperature of from about 100° C. to about 200° C.

References Cited

UNITED STATES PATENTS 2,929,804 3/1960 Steuber _____ 260—77.5
3,355,435 11/1967 Finelli _____ 260—75

DONALD E. CZAJA, *Primary Examiner.*

H. S. COCKERAM, *Assistant Examiner.*